US011891682B2

(12) United States Patent
Watanabe et al.

(10) Patent No.: US 11,891,682 B2
(45) Date of Patent: Feb. 6, 2024

(54) IRON-BASED SINTERED ALLOY AND METHOD FOR PRODUCING THE SAME

(71) Applicant: THE JAPAN STEEL WORKS, LTD., Tokyo (JP)

(72) Inventors: Yusuke Watanabe, Hiroshima (JP); Kakeru Kusada, Hiroshima (JP); Tetsuo Makida, Hiroshima (JP); Youhei Sawamura, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 289 days.

(21) Appl. No.: 16/922,373

(22) Filed: Jul. 7, 2020

(65) Prior Publication Data

US 2020/0332403 A1 Oct. 22, 2020

Related U.S. Application Data

(62) Division of application No. 15/190,643, filed on Jun. 23, 2016, now Pat. No. 10,745,786.

(30) Foreign Application Priority Data

Jun. 24, 2015 (JP) ................................ 2015-127114

(51) Int. Cl.
*C22C 38/56* (2006.01)
*C22C 38/44* (2006.01)
(Continued)

(52) U.S. Cl.
CPC ................ *C22C 38/56* (2013.01); *B22F 1/00* (2013.01); *B22F 3/04* (2013.01); *B22F 3/16* (2013.01);
(Continued)

(58) Field of Classification Search
CPC ......... C22C 38/50; C22C 38/52; C22C 38/56; C22C 38/105; C22C 38/12; C22C 38/18;
(Continued)

(56) References Cited

U.S. PATENT DOCUMENTS 3,715,792 A 2/1973 Prill et al.
4,469,514 A * 9/1984 Holtz, Jr. ............ C22C 33/0292 420/101
(Continued)

FOREIGN PATENT DOCUMENTS

CH 498 200 A 10/1970
EP 0365506 A2 4/1990
(Continued)

OTHER PUBLICATIONS

Parashivamurthy, K.I et al. "Review on TiC reinforced steel composites." 2001. Journal of Materials Science. 36. p. 4519-4530. (Year: 2001).*
(Continued)

*Primary Examiner* — Nicholas A Wang
(74) *Attorney, Agent, or Firm* — Sughrue Mion, PLLC

(57) ABSTRACT

An iron-based sintered alloy, which has a composition including, in terms of percent by mass, Ti: 18.4 to 24.6%, Mo: 2.8 to 6.6%, C: 4.7 to 7.0%, Cr: 7.5 to 10.0%, Ni: 4.5 to 6.5%, Co: 1.5 to 4.5%, Al: 0.6 to 1.0%, the balance being Fe and unavoidable impurities, wherein the alloy has a structure in which hard particles are dispersed in an island form in a matrix, among other characteristics.

6 Claims, 5 Drawing Sheets

(51) Int. Cl.

| | |
|---|---|
| ***C22C 38/22*** | (2006.01) |
| ***C22C 38/36*** | (2006.01) |
| ***C22C 33/02*** | (2006.01) |
| ***C22C 38/14*** | (2006.01) |
| ***B22F 1/00*** | (2022.01) |
| ***B22F 3/04*** | (2006.01) |
| ***B22F 3/16*** | (2006.01) |
| ***B22F 3/24*** | (2006.01) |
| ***B22F 9/04*** | (2006.01) |
| ***B26F 1/44*** | (2006.01) |
| ***C22C 38/06*** | (2006.01) |
| ***C22C 38/50*** | (2006.01) |
| ***C22C 38/52*** | (2006.01) |
| *B22F 5/00* | (2006.01) |

(52) U.S. Cl.
CPC .................. *B22F 3/24* (2013.01); *B22F 9/04* (2013.01); *B26F 1/44* (2013.01); *C22C 33/0285* (2013.01); *C22C 33/0292* (2013.01); *C22C 38/06* (2013.01); *C22C 38/14* (2013.01); *C22C 38/22* (2013.01); *C22C 38/36* (2013.01); *C22C 38/44* (2013.01); *C22C 38/50* (2013.01); *C22C 38/52* (2013.01); *B22F 2003/248* (2013.01); *B22F 2005/001* (2013.01); *B22F 2201/20* (2013.01); *B22F 2301/35* (2013.01); *B22F 2302/10* (2013.01); *B22F 2304/10* (2013.01); *B22F 2998/10* (2013.01); *B26F 2001/4436* (2013.01)

(58) Field of Classification Search
CPC .............. B22F 1/0003; B22F 2003/248; B22F 2005/001; B22F 2201/20; B22F 2301/35; B22F 2302/10; B22F 2304/10; B22F 2998/10; B22F 3/04; B22F 3/16; B22F 3/24; B22F 9/04
See application file for complete search history.

(56) References Cited

U.S. PATENT DOCUMENTS

| | | | | |
|---|---|---|---|---|
| 5,080,713 | A | 1/1992 | Ishibashi et al. | |
| 2008/0295658 | A1 * | 12/2008 | Donnadieu | C23C 30/005 83/13 |

FOREIGN PATENT DOCUMENTS

| | | | |
|---|---|---|---|
| JP | 1-268849 | A | 10/1989 |
| JP | 11-92870 | A | 4/1999 |
| JP | H1192870 | * | 4/1999 |
| JP | 2000-256799 | A | 9/2000 |
| JP | 2000256799 | * | 9/2000 |
| JP | 2008-307711 | A | 12/2008 |

OTHER PUBLICATIONS

Communication dated Dec. 7, 2016 issued by the European Patent Office in European Patent Application No. 16176129.1.
Communication dated Oct. 13, 2017, issued by the Japanese Patent Office in Japanese application No. 2015-127114.

* cited by examiner

IRON-BASED SINTERED ALLOY AND METHOD FOR PRODUCING THE SAME

This is a Divisional Application of U.S. application Ser. No. 15/190,643 filed on Jun. 23, 2016, which claims priority from Japanese Patent Application No. 2015-127114 filed on Jun. 24, 2015, the entire contents of which are incorporated herein by reference.

BACKGROUND

1. Technical Field

The present disclosure relates to an iron-based sintered alloy to be suitably used as a die material and a cutter blade material for a pelletizer of a resin extruder in pairs, and a method for producing the same.

2. Description of the Related Art

Since a cutter blade or the like for a pelletizer of a resin extruder is severely worn under a corrosive environment, excellent corrosion resistance and wear resistance are required. Also, a tool material to be used in the cutter blade and the like for a pelletizer of a resin extruder desirably has not only excellent corrosion resistance and wear resistance but also machinability for processing the material into the cutter blade or the like.

To such a request, for example, JP-A-H11-92870 proposes a material which is machinable, has a predetermined level of hardness and excellent wear resistance, and is excellent in corrosion resistance, obtainable by dispersing appropriate amounts of carbides in high strength stainless steel. That is, there is proposed a highly corrosion-resistant carbide-dispersed material in which carbides of Ti and Mo are dispersed in a matrix, wherein the carbide-dispersed material contains, in terms of weight ratio, Ti; 18.3 to 24%, Mo; 2.8 to 6.6%, C; 4.7 to 7% as the carbides and contains Cr; 7.5 to 10%, Ni; 4.5 to 6.5%, Co; 1.5 to 4.5%, and 0.6 to 1% of one or more of Al, Ti, and Nb as the matrix, the balance being Fe and unavoidable impurities.

Moreover, JP-A-2000-256799 proposes a highly corrosion-resistant carbide-dispersed material in which carbides of Ti and Mo are dispersed in a matrix, wherein the carbide-dispersed material contains, in terms of weight ratio, Ti; 18.3 to 24%, Mo; 2.8 to 6.6%, C; 4.7 to 7% as the carbides and contains Cr; 7.5 to 10%, Ni; 4.5 to 6.5%, Cu; 1 to 4.5%, Co; 0 to 4.5%, and 0.6 to 1% of one or more of Al, Ti, and Nb as the matrix, the balance being Fe and unavoidable impurities. According to the example, the highly corrosion-resistant carbide-dispersed material has a hardness of 46.0 to 49.8 HRC after sintering, is machinable, and has a hardness of 58.0 to 63.5 HRC and a bending strength of 126 to 155 kgf/mm$^2$ after an aging treatment.

However, resin materials to be used in a resin extruder are various materials and application ranges thereof have been extended, so that the tool material to be used for the cutter blade and the like for a pelletizer is required to have higher corrosion resistance, wear resistance, machinability, or mechanical strength. The highly corrosion-resistant carbide-dispersed materials proposed in JP-A-H11-92870 and JP-A-2000-256799 have a problem that they cannot always cope with such requirements sufficiently.

SUMMARY

Illustrative aspects of the present disclosure provide an iron-based sintered alloy having remarkably excellent characteristics in corrosion resistance, wear resistance, machinability, or mechanical strength according to an application target of a resin extruder. The iron-based sintered alloy may be suitably used as die and cutter blade materials for a pelletizer of the resin extruder in pairs.

According to a first illustrative aspect, there may be provided a method for producing an iron-based sintered alloy that is used in sliding components in pairs, the iron-based sintered alloy having a composition comprising, in terms of percent by mass, Ti: 18.4 to 24.6%, Mo: 2.8 to 6.6%, C: 4.7 to 7.0%, Cr: 7.5 to 10.0%, Ni: 4.5 to 6.5%, Co: 1.5 to 4.5%, Al: 0.6 to 1.0%, the balance being Fe and unavoidable impurities, wherein the alloy has a structure in which hard particles are dispersed in an island shape in a matrix and, wherein the method comprises, while an area ratio of the hard particles is kept constant, controlling a maximum circle equivalent diameter of the hard particles to a predetermined value of 40 to 10 μm.

The area ratio of the hard particles may be 38% to 41% and standard deviation of the area ratio of the hard particles may be 2.5 to 3.5. Ti, Mo, and C forming the hard particles may be supplied as a TiC powder and a Mo powder.

The components used in pairs may be components to be used as a die and a cutter blade.

According to a second illustrative aspect, there may be provided an iron-based sintered alloy which is used in a die and a cutter blade for a pelletizer of a resin extruder, the iron-based sintered alloy having a composition comprising, in terms of percent by mass, Ti: 18.4 to 24.6%, Mo: 2.8 to 6.6%, C: 4.7 to 7.0%, Cr: 7.5 to 10.0%, Ni: 4.5 to 6.5%, Co: 1.5 to 4.5%, Al: 0.6 to 1.0%, the balance being Fe and unavoidable impurities, and the iron-based sintered alloy having a structure in which hard particles are dispersed in an island shape in a matrix, wherein a coefficient of friction after passing through a conforming stage is 0.12 or less in a friction test in water by a cutter blade-on-disk method simulating a die and a cutter blade.

According to a third illustrative aspect, there may be provided an iron-based sintered alloy that is used in sliding components in pairs, the iron-based sintered alloy having a composition comprising, in terms of percent by mass, Ti: 18.4 to 24.6%, Mo: 2.8 to 6.6%, C: 4.7 to 7.0%, Cr: 7.5 to 10.0%, Ni: 4.5 to 6.5%, Co: 1.5 to 4.5%, Al: 0.6 to 1.0%, the balance being Fe and unavoidable impurities, wherein the alloy has a structure in which hard particles are dispersed in an island shape in a matrix, an area ratio of the hard particles is within a constant range and a maximum circle equivalent diameter of the hard particles is a predetermined value of 40 μm to 10 μm.

According to a fourth illustrative aspect, there may be provided a method for producing the iron-based sintered alloy according to the third illustrative aspect, the method comprising: forming a compact by mixing material powders including TiC, Mo, Ni, Cr, Co, Al and Fe and subjecting the mixture by a cold isostatic pressing method; and subjecting the formed compact to a vacuum sintering, a solution treatment and an aging treatment.

The iron-based sintered alloy according to the present disclosure has remarkably excellent characteristics in corrosion resistance, wear resistance, machinability, or mechanical strength, has relatively low hardness after sintering, and has high bending strength after an aging treatment. The iron-based sintered alloy according to the disclosure has high wear resistance particularly in the case where the alloy is processed into a die and a cutter blade of a pelletizer to be provided on a resin extruder and they are used in pairs.

DETAILED DESCRIPTION

Figure 1:
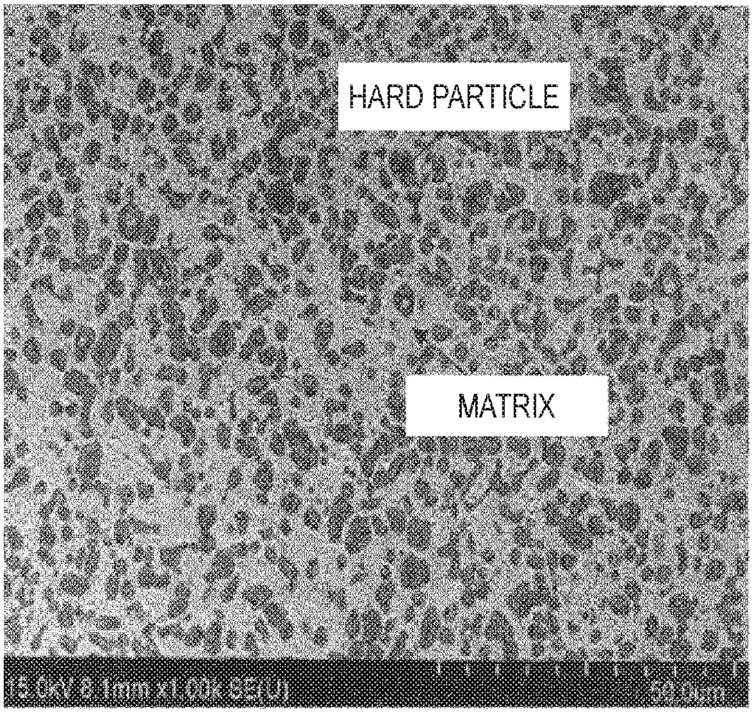
FIG. 1 is a SEM photograph of an iron-based sintered alloy according to the disclosure.
Figure 2:
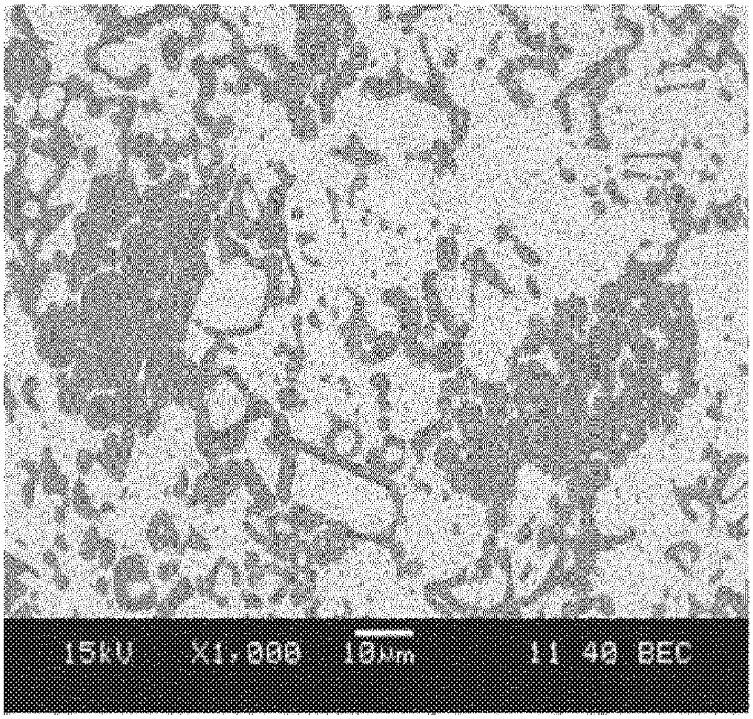
FIG. 2 is a SEM photograph of a material of Comparative Example.

Illustrative embodiments will now be described with reference to the accompanying drawings. FIG. 1 is a scanning electron microscope (SEM) photograph showing a structure of an iron-based sintered alloy according to the disclosure. FIG. 2 is a SEM photograph showing a structure of a commercially available carbide-dispersed iron-based sintered alloy material (material of Comparative Example) widely used in a cutter blade for a pelletizer, a punch of a punching die, and the like. In FIGS. 1 and 2, the black portions scattered in an island shape in a matrix are titanium carbide, molybdenum carbide, or a composite carbide of titanium and molybdenum and are particle (hard particle) portions having high hardness. As shown in FIG. 1, the iron-based sintered alloy according to the disclosure is characterized in that the hard particles have a fine and relatively uniform shape and are homogeneously dispersed over the whole matrix.

Figure 3:
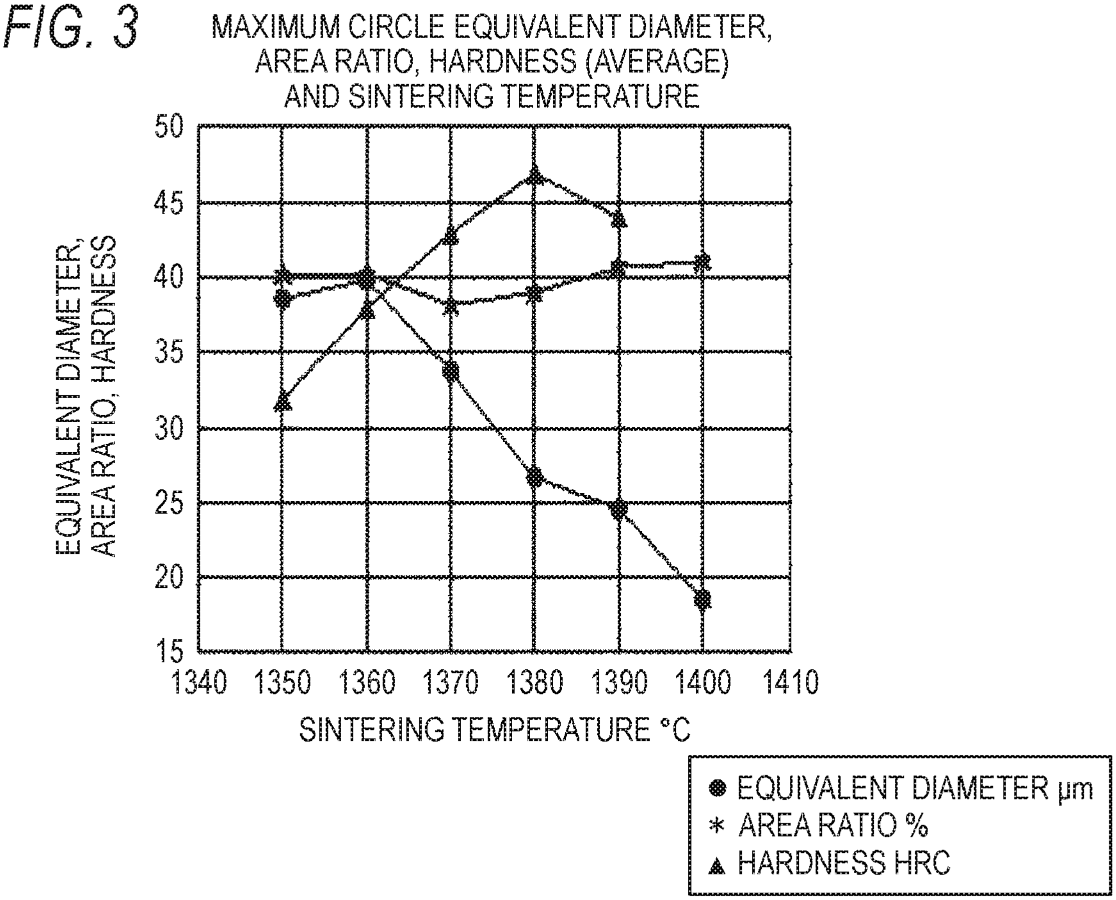
FIG. 3 is a graph showing maximum circle equivalent diameter and area ratio, and Rockwell hardness after sintering of an iron-based sintered alloy according to the disclosure.

The present iron-based sintered alloy is manufactured by forming a mixed powder, which has been obtained by mixing a predetermined powder (e.g., the predetermined power may contain 23 to 30.8 mass % of TiC powder, 2.8 to 6.6 mass % of Mo powder, 4.5 to 6.5 mass % of Ni powder, 7.5 to 10.0 mass % of Cr powder, 1.5 to 4.5 mass % of Co powder, 0.6 to 1.0 mass % of Al powder and 40.6 to 60 mass % of Fe powder) in a wet ball mill, by a cold isostatic pressing (CIP) method (e.g., by applying a pressure of 1,000 to 4,000 kgf/cm$^2$) and subjecting the formed compact (e.g., having a columnar shape having a diameter of 50 to 200 mm and a height of 25 to 60 mm or a cuboid shape having a length of 55 to 150 mm, a width of 100 to 275 mm and a height of 45 to 60 mm) to vacuum sintering, a solution treatment, and an aging treatment at predetermined temperatures (e.g., the vacuum sintering is performed at a sintering temperature of 1,360 to 1,400° C. (preferably, 1,380 to 1,400° C.) for 4 to 6 hours), the solution treatment is performed at a temperature of 800 to 1,050° C. for 3 to 8 hours, and the aging treatment is performed at a temperature of 440 to 530° C. for 4 to 10 hours). As shown in FIG. 3, the iron-based sintered alloy is characterized in that it can be manufactured so that, while an area ratio of hard particles existing in the matrix is kept constant (is not changed), a maximum circle equivalent diameter (in terms of a projected area circle equivalent diameter) thereof is controlled to a predetermined value. In FIG. 3, the horizontal axis shows sintering temperature in the vacuum sintering and the vertical axis shows the maximum circle equivalent diameter (equivalent diameter) or area ratio of the hard particles after the aging treatment is performed and Rockwell hardness (hardness) after the vacuum sintering. Incidentally, FIG. 3 shows an average of 5 test specimens at each point.

Figure 4:
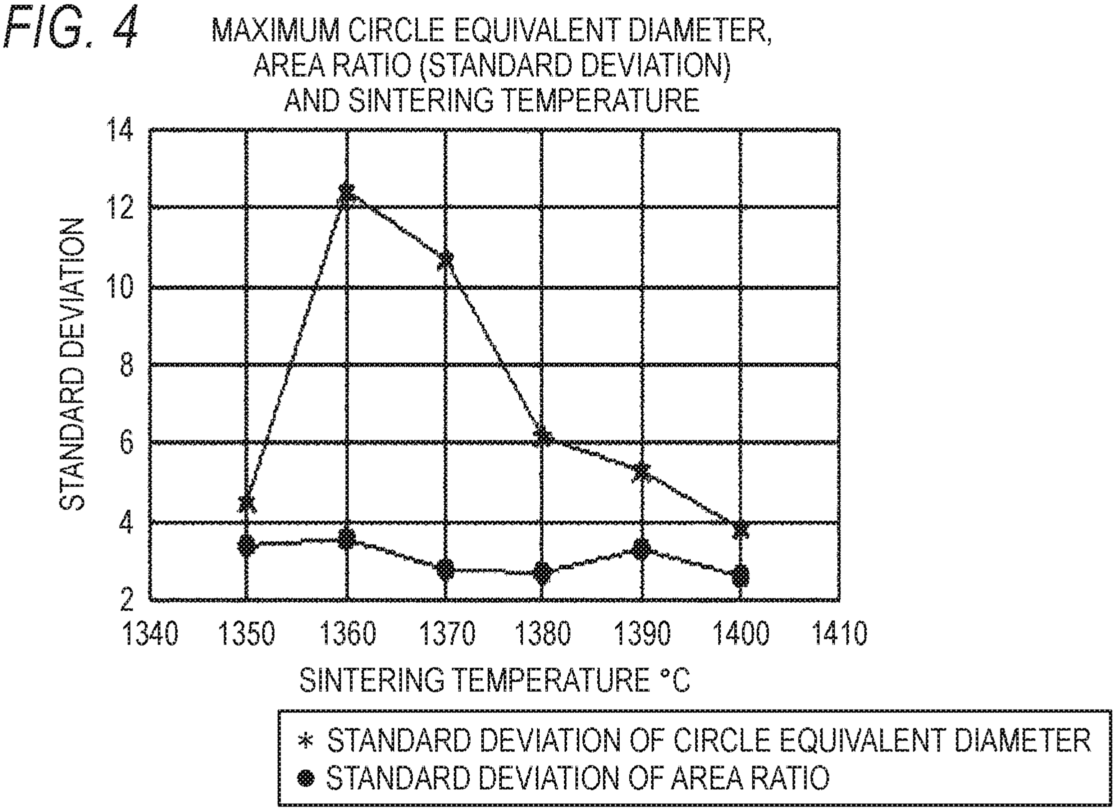
FIG. 4 is a graph showing standard deviation of the maximum circle equivalent diameter and the area ratio shown in FIG. 3.

As shown in FIG. 3, at a sintering temperature of 1,360 to 1,400° C., the area ratio of the hard particles (asterisk) is 38 to 41% (about 40%) and is constant and the maximum circle equivalent diameter (●) decreases in reverse proportion to the sintering temperature. In the present iron-based sintered alloy, the structure is observed like a structure formed through gradual decay from large-diameter hard particles as if the maximum diameter of the hard particles that can exist at the sintering temperature is present. This is also understood from the fact that variation (standard deviation) in the area ratio and maximum circle equivalent diameter of the hard particles shown in FIG. 4 is small. In FIG. 4, the horizontal axis shows the sintering temperature and the vertical axis shows standard deviation of the area ratio and maximum circle equivalent diameter of the hard particles. According to FIG. 4, at a sintering temperature of 1,360 to 1,400° C., the standard deviation of the area ratio is about 2% (2.5 to 3.5%) and is constant. With regard to the maximum circle equivalent diameter, the standard deviation is 12 to 11 μm at a sintering temperature of 1,360 to 1,370° C. that is relatively large as compared to that at other sintering temperatures within 1,350 to 1,400° C. and is small at a sintering temperature of 1,380 to 1,400° C. At a sintering temperature of 1,380 to 1,400° C., the standard deviation of the maximum circle equivalent diameter is 6 to 4 μm and is very small.

According to FIG. 3 and FIG. 4, at a sintering temperature of 1,350° C. or 1,350 to 1,360° C., a singular appearance in the average and standard deviation of the maximum circle equivalent diameter is observed. The following Table 1 shows the average, standard deviation, and a coefficient of variation of the maximum circle equivalent diameter at each sintering temperature. At a sintering temperature of 1,350 to 1,400° C., a singular point is observed in the coefficient of variation (standard deviation/average) at a sintering temperature of 1,350° C. According to this, it is understood that the case where the sintering temperature is 1,350° C. is structurally different from the sintering at a sintering temperature of 1,360 to 1,400° C.

TABLE 1

| Sintering temperature (° C.) | Average (μm) | Standard deviation (μm) | Coefficient of variation |
|---|---|---|---|
| 1,350 | 38.64 | 4.57 | 0.12 |
| 1,360 | 39.87 | 12.52 | 0.31 |
| 1,370 | 33.87 | 10.71 | 0.32 |
| 1,380 | 26.77 | 6.21 | 0.23 |
| 1,390 | 24.78 | 5.39 | 0.22 |
| 1,400 | 18.67 | 3.9 | 0.21 |

Moreover, according to FIG. 3, Rockwell hardness (A) of the present iron-based sintered alloy after sintering increases in proportion to the sintering temperature when the sintering temperature is in a range of 1,350 to 1,380° C. (31 to 46 HRC) and when the sintering temperature exceeds 1,380° C., it is observed that the hardness becomes a constant value or decreases. However, the highest value of the hardness is 46 HRC at a sintering temperature of 1,380° C. and thus the iron-based sintered alloy has sufficient machinability.

Example 1

Figure 5A:
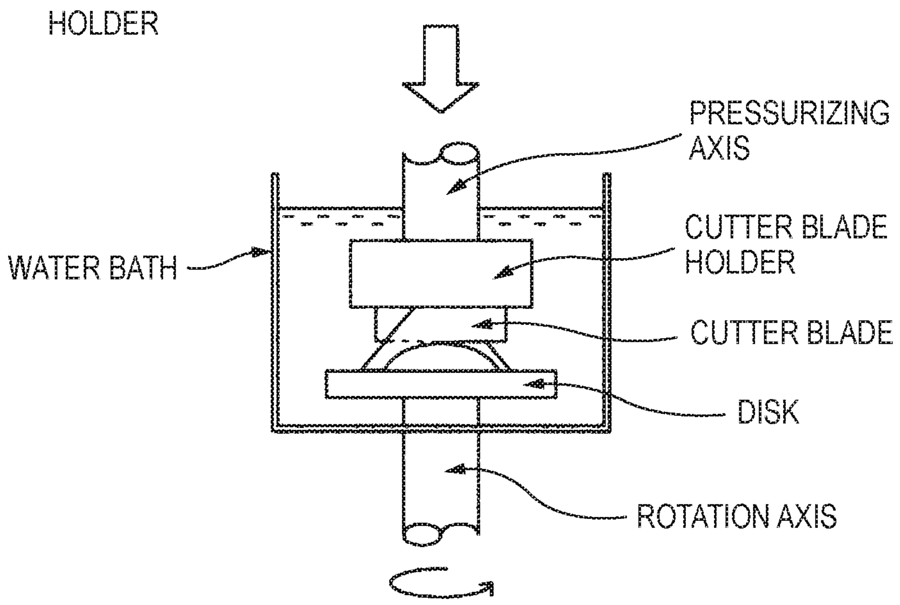
FIG. 5A to 5C are schematic views showing a test specimen shape for a wear test and a wear testing machine portion fitted therewith.
Figure 5B:
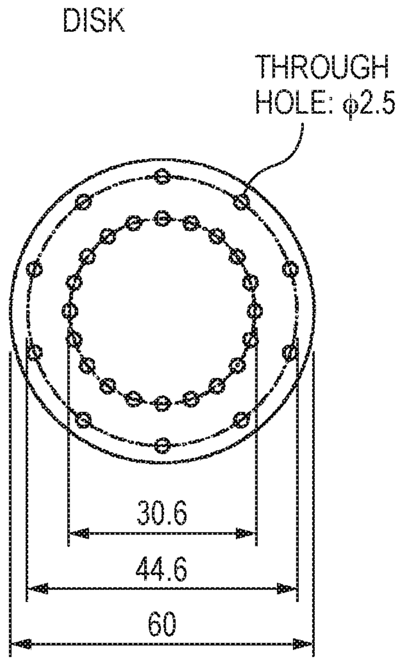
Figure 5C:
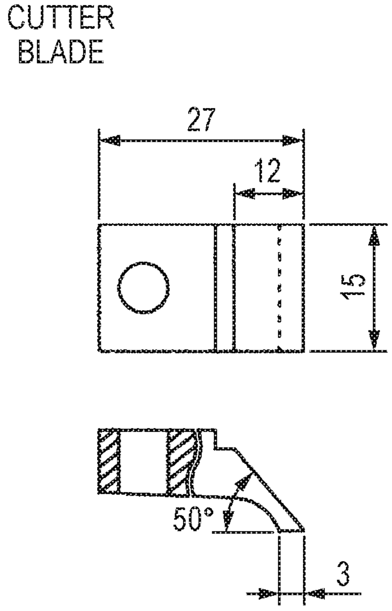

An iron-based sintered alloy according to the present disclosure was manufactured. From the material, five disks and cutter blades were cut out and a wear test in water by a cutter blade-on-disk method was performed. FIGS. 5B and 5C show the shapes of the disk and the cutter blade used in the wear test, respectively. The disk and cutter blade were put into a wear testing machine (e.g., "EFM-III-1010-ADX", a schematic diagram of which is shown in FIG. 5A) having a rotation mechanism, pressurization mechanism and a temperature control mechanism and the wear test was performed. The hardness of the disk and the hardness of the cutter blade were both 57 HRC as hardness after an aging treatment. The wear test was performed under a contact face pressure of 5.8 kg/cm$^2$ at a peripheral speed of 5.2 m/sec and the test time was 10 hours. Volume of water bath was 1.8 L and temperature of water was 30° C. Incidentally, using the disk and cutter blade cut out from the material of Comparative Example, the same wear test as above was performed.

The iron-based sintered alloy was manufactured as shown below. That is, a compounding powder of the powders shown in Table 2 were mixed in a ball mill, the resulting mixed powder was filled into a rubber mold having a space of 000×50 mm so as to be formed into a columnar shape having a diameter of 100 mm and a height of 50 mm, and, after sealing, was formed by a CIP method by applying a pressure of 1,500 kgf/cm$^2$, and the resulting compact was heated under vacuum at 1,380° C. for 5 hours, thereby performing vacuum sintering. Thereafter, a solution treatment was performed under a temperature at 850° C. for 4 hours and an aging treatment under a temperature at 500° C. for 6 hours was conducted. Table 3 shows maximum circle equivalent diameter and area ratio of the structure of the manufactured iron-based sintered alloy (Inventive Example). As shown in Table 3, Inventive Example (present iron-based sintered alloy) has a maximum circle equivalent diameter of hard particles of about 16 μm and the size is ½ or less of that of Comparative Example and the standard deviation of the maximum circle equivalent diameter is about 2 μm and is ¼ or less of that in Comparative Example. The inventive Example has an area ratio of hard particles of 40%, which is about the same as in the case of Comparative Example (43%) but the standard deviation of the area ratio is 1.2%, which is considerably smaller than that in the case of Comparative Example (4.5%). That is, Inventive Example is characterized in that small hard particles are homogeneously dispersed as a whole.

In the disclosure, with regard to the carbides, it is suitable that only TiC is supplied as a powder and the others are supplied as individual metal powders, for example, a Mo powder. As the TiC powder, a commercially available one having a particle size of 1 to 2 μm was used. Incidentally, as for materials of Comparative Example, Table 2 shows a chemical composition and Table 3 shows the maximum circle equivalent diameter and area ratio of the structure, as well.

TABLE 2

| | Chemical composition (mass %) | | | | | | | |
|---|---|---|---|---|---|---|---|---|
| | TiC | Mo | Ni | Cr | Co | Al | Cu | Fe |
| Inventive Example | 27 | 5 | 5.7 | 8.8 | 2.9 | 0.7 | — | 49.9 |
| Comparative Example | 30 to 32 | 2 to 4 | 3 to 4.5 | 9 to 10 | 3 to 6.5 | 0 to 1 | 0 to 1 | 1 to 2 |

TABLE 3

| | Maximum circle equivalent diameter (μm) | | Area ratio (%) | |
|---|---|---|---|---|
| | Average | Standard deviation | Average | Standard deviation |
| Inventive Example | 15.9 | 2.01 | 39.58 | 1.21 |
| Comparative Example | 37.8 | 9.89 | 43.17 | 4.51 |

Figure 6:
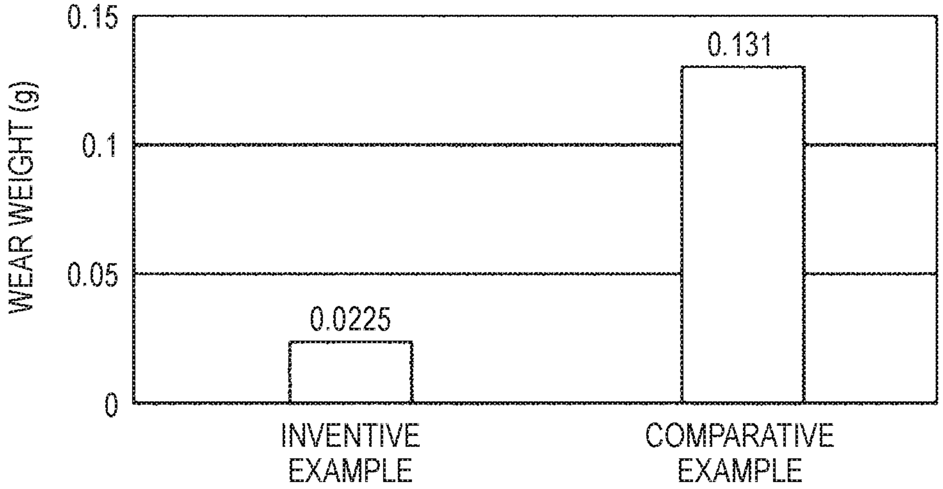
FIG. 6 is a graph showing wear weight of a cutter blade after a wear test.
Figure 7A:
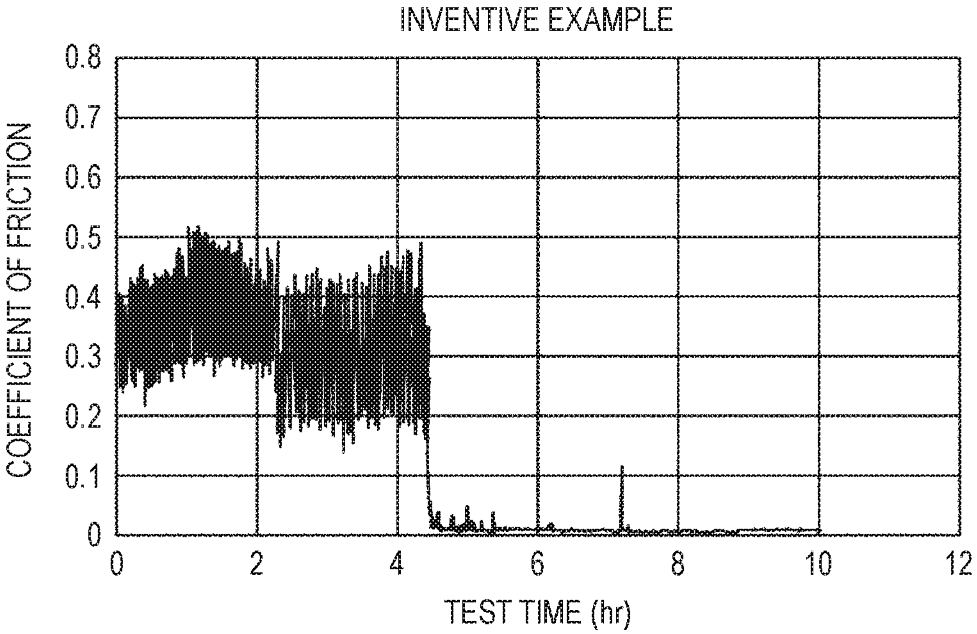
FIGS. 7A and 7B are graphs showing a changing state of a coefficient of friction during a wear test.
Figure 7B:
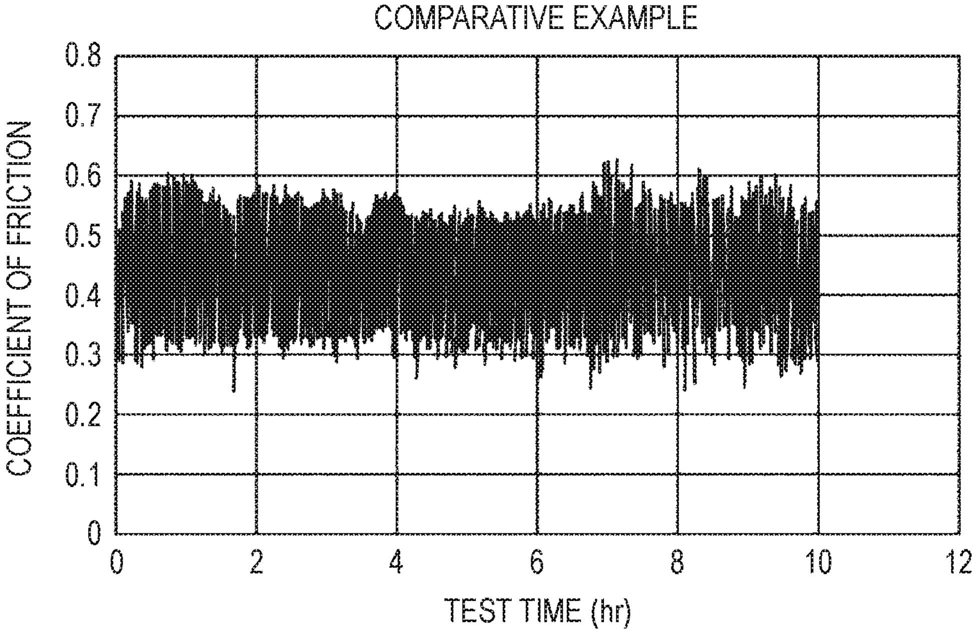

FIG. 6 shows wear weight of the cutter blade by the wear test after the passage of 10 hours and FIGS. 7A and 7B show a changing state of the coefficient of friction during the wear test. According to FIG. 6, the wear weight in Inventive Example is ⅓ or less of that in Comparative Example. According to FIG. 7A, the coefficient of friction in Inventive Example gradually increases until 1 hour from the start of the test (0.25 to 0.50), thereafter slightly decreases, after 2.1 hours, sharply decreases, subsequently fluctuates within the range of 0.15 to 0.45 until 4.2 hours, and is near to almost 0 (0.05 or less) after 4.2 hours. Incidentally, the coefficient of friction becomes about 0.1158 after 7.156 to 7.167 hours. That is, the present iron-based sintered alloy has a coefficient of friction of at least about 0.12 or less, mainly 0.1 or less and specifically, near to almost 0 in the wear test in water after passing through a certain conforming stage. On the other hand, the coefficient of friction of Comparative Example fluctuates within a certain range during the test time (0.3 to 0.6).

What is claimed is:

1. An iron-based sintered alloy which is used in a die and a cutter blade for a pelletizer of a resin extruder, the iron-based sintered alloy having a composition comprising, in terms of percent by mass, Ti: 18.4 to 24.6%, Mo: 2.8 to 6.6%, C: 4.7 to 7.0%, Cr: 7.5 to 10.0%, Ni: 4.5 to 6.5%, Co: 1.5 to 4.5%, Al: 0.6 to 1.0%, the balance being Fe and unavoidable impurities, and the iron-based sintered alloy having a structure in which hard particles are dispersed in a matrix, wherein a coefficient of friction after passing through a conforming stage is 0.12 or less in a friction test in water by a cutter blade-on-disk method simulating a die and a cutter blade, the maximum circle equivalent diameter of the hard particles is a predetermined value of 26.77 μm to 10 μm, and the hard particles have a fine and relatively uniform shape and are homogenously dispersed over the whole matrix.

2. An iron-based sintered alloy that is used in sliding components in pairs, the iron-based sintered alloy having a composition comprising, in terms of percent by mass, Ti: 18.4 to 24.6%, Mo: 2.8 to 6.6%, C: 4.7 to 7.0%, Cr: 7.5 to 10.0%, Ni: 4.5 to 6.5%, Co: 1.5 to 4.5%, Al: 0.6 to 1.0%, the balance being Fe and unavoidable impurities, wherein the alloy has a structure in which hard particles are dispersed in a matrix, an area ratio of the hard particles is 38% to 41% and standard deviation of the area ratio of the hard particles is 2.5 to 3.5, and a maximum circle equivalent diameter of the hard particles is a predetermined value of 26.77 μm to 10 μm, and the hard particles have a fine and relatively uniform shape and are homogenously dispersed over the whole matrix.

3. The iron-based sintered alloy according to claim 2, wherein the hard particles are formed from a titanium carbide, a Mo carbide or a composite carbide of titanium and molybdenum.

4. The iron-based sintered alloy according to claim 2, wherein the components used in pairs are components to be used as a die and a cutter blade.

5. The iron-based sintered alloy according to claim 2, wherein a coefficient of friction after passing through a conforming stage is 0.12 or less in a friction test in water by a cutter blade-on-disk method simulating a die and a cutter blade.

6. The iron-based sintered alloy according to claim 2, wherein standard deviation of the maximum circle equivalent diameter is 6 μm to 4 μm.

* * * * *